(12) United States Patent
Kageyama

(10) Patent No.: US 6,815,843 B1
(45) Date of Patent: Nov. 9, 2004

(54) POWER SUPPLY DEVICE

(75) Inventor: Hironobu Kageyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 17 days.

(21) Appl. No.: 09/658,280

(22) Filed: Sep. 8, 2000

(30) Foreign Application Priority Data

Dec. 21, 1999 (JP) ............................................ 11-363523

(51) Int. Cl.$^7$ ............................................. H03M 13/00
(52) U.S. Cl. ........................................... 307/42; 307/64
(58) Field of Search .............................. 307/64, 66, 65, 307/42

(56) References Cited

U.S. PATENT DOCUMENTS

| | | | | |
|---|---|---|---|---|
| 4,651,020 A | * | 3/1987 | Kenny et al. .................. | 307/43 |
| 5,122,726 A | * | 6/1992 | Elliott et al. ................. | 323/272 |
| 5,745,356 A | * | 4/1998 | Tassitino et al. .............. | 307/32 |
| 5,745,670 A | * | 4/1998 | Linde ........................... | 307/64 |
| 5,886,424 A | * | 3/1999 | Kim ............................. | 307/64 |
| 5,894,413 A | * | 4/1999 | Ferguson ...................... | 307/43 |
| 6,018,204 A | * | 1/2000 | Kuruma ........................ | 307/64 |
| 6,041,414 A | * | 3/2000 | Kikuchi ........................ | 307/38 |
| 6,121,695 A | * | 9/2000 | Loh ............................. | 307/64 |
| 6,153,946 A | * | 11/2000 | Koch et al. .................... | 307/64 |
| 6,301,133 B1 | * | 10/2001 | Cuadra et al. ................. | 363/65 |
| 6,320,771 B1 | * | 11/2001 | Hemena et al. ............... | 323/272 |

* cited by examiner

Primary Examiner—Brian Sircus
Assistant Examiner—Roberto J. Rios
(74) Attorney, Agent, or Firm—Staas & Halsey LLP

(57) ABSTRACT

A power supply device with n power supply units comprises main power supplies generating DC voltage supplies $V_{DC1}$ to $V_{DCn}$ supplied to a load, respectively, unit side control sections each informing a main control section of the result of abnormality monitoring of each section, and control power supplies supplying DC voltage supplies $V_{B1}$ to $V_{Bn}$ to the unit side control sections, respectively. For example, the unit side control section is parallel connected to the control power supply units of other power supply units in addition to the control power supply.

4 Claims, 6 Drawing Sheets

PRIOR ART

POWER SUPPLY DEVICE

FIELD OF THE INVENTION

The present invention relates to a power supply device for supplying electric power to an information processor, such as a server, and more particularly to a power supply device in which a parallel redundancy structure is adopted.

BACKGROUND OF THE INVENTION

Recently, according to the massive spread of the Internet, high reliability and cost performance are required for an information processor, such as a server, that forms the core of the Internet. Here, the reliability and the cost of an information processor are largely influenced by the reliability of the power supply device by which electric power is supplied to the information processor. Thus, high reliability and cost performance are required also for the power supply device.

FIG. 5 is a block diagram showing the structure of a power supply 10 in the prior art. The power supply 10 shown in this drawing is mounted in an information processor (whose drawing is omitted), such as a server, converts an AC voltage source $V_{AC}$ into a DC voltage supply $V_{DC}$, and supplies this DC voltage supply $V_{DC}$ to a load 20. As this load 20, a printed board circuit mounted in an information processor, a magnetic disk unit, or the like are given.

The power supply 10 is provided with n power supply units $11_1$ to $11_n$. Respective these power supply units $11_1$ to $11_n$ are identically constituted wherein a parallel redundancy structure is adopted so that even when the DC voltage supply output of at least one power supply unit is stopped, the load 20 is not influenced by other power supply units. These power supply units $11_1$ to $11_n$ are inserted into plural slots provided inside the information processor, respectively, and are provided with a function by which hot-line maintenance can be executed without stopping the supply of the DC voltage supply to the load 20.

The power supply unit $11_1$ is inserted between a feeder terminal $TA_1$ and the load 20, converts the AC voltage source $V_{AC}$ supplied to the feeder terminal $TA_1$ into a DC voltage supply $V_{DC1}$, and supplies this DC voltage supply $V_{DC1}$ to the load 20. In the power supply unit $11_1$, a main power supply unit $12_1$ is provided with an AC/DC (Alternating Current/Direct Current) converting function and converts the AC voltage source $V_{AC}$ into the DC voltage supply $V_{DC1}$. The main power supply unit $12_1$ supplies the DC voltage supply $V_{DC1}$ to the load 20 via a power supply cable (whose drawing is omitted).

A main power supply control section $13_1$ is provided in the main power supply unit $12_1$ and performs an ON/OFF control of the AC/DC converting function and abnormality monitoring of the main power supply unit $12_1$. When abnormality occurs in the main power supply unit $12_1$, the main power supply control section $13_1$ transmits an abnormality detection signal to a unit side control section $17_1$. A diode $14_1$ is an element provided in the downstream side of the main power supply unit $12_1$ and preventing a rush current from flowing in the main power supply unit $12_1$ when the power supply unit $11_1$ is inserted in the slot of the information processor. A control power supply unit $15_1$ is inserted between the feeder terminal $TA_1$ and a main control section 30 and converts the AC voltage source $V_{AC}$ supplied to the feeder terminal $TA_1$ into a DC voltage supply $V_{A1}$, a DC voltage supply $V_{B1}$, and a DC voltage supply $V_{C1}$.

The control power supply unit $15_1$ supplies the DC voltage supply $V_{A1}$ to the main power supply control section $13_1$, the DC voltage supply $V_{B1}$ to the unit side control section $17_1$, and the DC voltage supply $V_{C1}$ to a DC/DC converting section 31 of the main control section 30, respectively. That is, in the power supply units $11_1$, the control power supply unit $15_1$ supplying the DC voltage supply to a control system including the main power supply control section $13_1$, the unit side control section $17_1$, and the main control section 30 (the DC/DC converting section 31) is provided, separated from the main power supply unit $12_1$. As the control power supply unit $15_1$, the one provided with a DC/DC converting function for converting the DC voltage supply $V_{DC}$ from the main power supply unit $12_1$ into a predetermined value of DC voltage supply may also be employed.

A diode $16_1$ is an element provided in the downstream side of the control power supply unit $15_1$ and preventing a rush current from flowing in the control power supply unit $15_1$ when the power supply unit $11_1$ is inserted in the slot of the information processor. The unit side control section $17_1$ is connected to the main control section 30 via an interface $18_1$ and works as a communication interface between the main power supply control section $13_1$ and the main control section 30.

Concretely, the unit side control section $17_1$ has the function by which an ON/OFF control signal from the main control section 30 is received via the interface $18_1$ and is transmitted to the main power supply control section $13_1$ and the function by which an abnormality detection signal from the main power supply control section $13_1$ is received and is transmitted to the main control section 30 via the interface $18_1$.

The power supply units $11_n$ of the number n is inserted between a feeder terminal $TA_n$ and the load 20, converts the AC voltage source $V_{AC}$ supplied to the feeder terminal $TA_n$ into a DC voltage supply $V_{DCn}$ and supplies this DC voltage supply $V_{DCn}$ to the load 20. In the power supply unit $11_n$, a main power supply unit $12_n$ is identically constituted with the main power supply unit $12_1$ and converts the AC voltage source $V_{AC}$ into the DC voltage supply $V_{DCn}$. A main power supply unit $12_n$ supplies the DC voltage supply $V_{DCn}$ to the load 20 via a power supply cable (whose drawing is omitted).

A main power supply control section $13_n$ is provided in the main power supply unit $12_n$ and performs an ON/OFF control of the AC/DC converting function and abnormality monitoring of the main power supply unit $12_n$. When abnormality occurs in the main power supply unit $12_n$, the main power supply control section $13_n$ transmits an abnormality detection signal to a unit side control section $17_n$. A diode $14_n$ is an element provided in the downstream side of the main power supply unit $12_n$ and preventing a rush current from flowing in the main power supply unit $12_n$ when the power supply unit $11_n$ is inserted in the slot of the information processor. A control power supply unit $15_n$ is inserted between the feeder terminal $TA_n$ and the main control section 30 and converts the AC voltage source $V_{AC}$ supplied to the feeder terminal $TA_n$ into a DC voltage supply $V_{An}$, a DC voltage supply $V_{Bn}$, and a DC voltage supply $V_{Cn}$.

The control power supply unit $15_n$ supplies the DC voltage supply $V_{An}$ to the main power supply control section $13_n$, the DC voltage supply $V_{Bn}$ to the unit side control section $17_n$, and the DC voltage supply $V_{Cn}$ to the DC/DC converting section 31 of the main control section 30, respectively. That is, in the power supply units $11_n$, the control power supply unit $15_n$ supplying the DC voltage supply to a control system including the main power supply control section $13_n$, the unit side control section $17_n$, and the main control section 30 (the DC/DC converting section 31) is provided, separated from the main power supply unit $12_n$, similarly to the power supply units $11_1$.

A diode $16_n$ is an element provided in the downstream side of the control power supply unit $15_n$ and preventing a rush current from flowing in the control power supply unit $15_n$ when the power supply unit $11_n$ is inserted in the slot of the information processor. The unit side control section $17_n$ is connected to the main control section 30 via an interface $18_n$ and works as a communication interface between the main power supply control section $13_n$ and the main control section 30.

Concretely, the unit side control section $17_n$ has the function by which an ON/OFF control signal from the main control section 30 is received via the interface $18_n$ and is transmitted to the main power supply control section $13_n$ and the function by which an abnormality detection signal from the main power supply control section $13_n$ is received and is transmitted to the main control section 30 via the interface $18_n$.

The main control section 30 is connected to the unit side control sections $17_1$ to $17_n$ via the interfaces $18_1$ to $18_n$ and performs ON/OFF controls and abnormality monitoring of the power supply units $11_1$ to $11_n$ (the main power supplies $12_1$ to $12_n$). The DC/DC converting section 31 is provided in the main control section 30, converts the DC voltage supply $V_C$ (the DC voltage supplies $V_{C1}$ to $V_{Cn}$) supplied from the control power supply units $15_1$ to $15_n$ into a predetermined value of DC voltage supply, and supplies this to each section of the main control section 30.

In the structure described above, the AC voltage source $V_{AC}$ supplied to the feeder terminal $TA_1$ is converted into the DC voltage supply $V_{A1}$, the DC voltage supply $V_{B1}$, and the DC voltage supply $V_{C1}$ by the control power supply unit $15_1$. The DC voltage supplies $V_{A1}$, $V_{B1}$, and $V_{C1}$ are supplied to the main power supply control section $13_1$, the unit side control section $17_1$, and the DC/DC converting section 31. With this, the main power supply control section $13_1$, the unit side control section $17_1$, and the main control section 30 become in operable states. At this time, it is supposed that the AC/DC converting function of the main power supply unit $12_1$ is in an OFF state, and the DC voltage supply $V_{DC1}$ is not outputted from the main power supply unit $12_1$.

Similar operations to that of the power supply units $11_1$ are performed in the power supply units $11_2$ (now shown) to $11_n$, at the same time as the operation described above. That is, the AC voltage source $V_{AC}$ supplied to the feeder terminal $TA_n$ is converted into the DC voltage supply $V_{An}$, the DC voltage supply $V_{Bn}$, and the DC voltage supply $V_{Cn}$ by the control power supply unit $15_n$. These DC voltage supplies $V_{An}$, $V_{Bn}$, and $V_{Cn}$ are supplied to the main power supply control section $13_n$, the unit side control section $17_n$, and the main control section 30 (the DC/DC converting section 31). With this, the main power supply control section $13_n$ and the unit side control section $17_n$ become in the operable state. At this time it is supposed that the AC/DC converting function of the main power supply unit $12_n$ is in an OFF state, and the DC voltage supply $V_{DCn}$ is not outputted from the main power supply unit $12_n$. The main control section 30 is already made operable.

When a start switch (not shown) of the main control section 30 is pressed down, an ON signal is transmitted from the main control section 30 to the respective unit side control sections $17_1$ to $17_n$ via the interfaces $18_1$ to $18_n$ in accordance with a predetermined sequence. When the ON signal is received, the unit side control section $17_1$ transmits the ON signal to the main power supply control section $13_1$. When receiving this ON signal, the main power supply control section $13_1$ turns the AC/DC converting function of the main power supply unit $12_1$ on. With this the main power supply unit $12_1$ converts the AC voltage source $V_{AC}$ supplied to the feeder terminal $TA_1$ into the DC voltage supply $V_{DC}1$ and then supplies this to the load 20 via the diode $14_1$ and the cable (not shown).

Similar operations to that of the power supply units $11_1$ is performed in the power supply units $11_2$ (now shown) to $11_n$, parallel to the operation of the power supply units $11_1$. That is, when the ON signal from the main control section 30 is received, the unit side control section $17_n$ transmits the ON signal to the main power supply control section $13_n$. When receiving this ON signal, the main power supply control section $13_n$ turns the AC/DC converting function of the main power supply unit $12_n$ on. With this the main power supply unit $12_n$ converts the AC voltage source $V_{AC}$ supplied to the feeder terminal $TA_n$ into the DC voltage supply $V_{DCn}$ and then supplies this to the load 20 via the diode $14_n$ and the cable (not shown).

When abnormality occurs in the main power supply unit $12_1$ and the output of the DC voltage supply $V_{DC1}$ from the main power supply unit $12_1$ is stopped, the main power supply control section $13_1$ transmits the abnormality detection signal to the unit side control section $17_1$. When receiving this abnormality detection signal, the unit side control section $17_1$ transmits the abnormality detection signal to the main control section 30 via the interface $18_1$. When receiving the abnormality detection signal, the main control section 30 generates a main abnormality alarm showing that abnormality has occurred in the main power supply unit $12_1$.

Next, another structural example of a conventional power supply device will be explained referring to FIG. 6. FIG. 6 is a block diagram showing the structure of a conventional power supply device 40. In this drawing, like reference numerals are attached to the sections corresponding to the respective sections of FIG. 5. In FIG. 6, external control power supply units $50_1$ and $50_2$, a feeder terminal $TB_1$, and a feeder terminal $TB_2$ are newly provided, and power supply units $41_1$ to $41_n$ are provided as substitutes for the power supply units $11_1$ to $11_n$ shown in FIG. 5.

The external control power supply unit $50_1$ converts the AC voltage source $V_{AC}$ supplied to the feeder terminal $TB_1$ into a DC voltage supply $V_{G1}$ and supplies this to a control system including the unit side control sections $17_1$ to $17_n$ and the DC/DC converting section 31 of the main control section 30 (the main control section 30) via a cable (not shown). This external control power supply unit $50_1$ is composed of an AC/DC converting section $51_1$ converting the AC voltage source $V_{AC}$ into the DC voltage supply $V_{G1}$ and a diode $52_1$ provided in the downstream side of the AC/DC converting section $51_1$. This diode $52_1$ is an element for preventing a rush current.

The external control power supply unit $50_2$ is juxtaposed with the external control power supply unit $50_1$, converts the AC voltage source $V_{AC}$ supplied to the feeder terminal $TB_2$ into a DC voltage supply $V_{G2}$, and supplies this to the control system including the unit side control sections $17_1$ to $17_n$ and the DC/DC converting section 31 (the main control section 30) via a cable (not shown). This external control power supply unit $50_2$ is composed of an AC/DC converting section $51_2$ converting the AC voltage source $V_{AC}$ into the DC voltage supply $V_{G2}$ and a diode $52_2$ provided in the downstream side of the AC/DC converting section $51_2$. This diode $52_2$ is an element for preventing a rush current.

These external control power supplies $50_1$ and $50_2$ are constituted as a parallel redundancy structure. Accordingly, even when the DC voltage supply output from one of the external control power supplies $50_1$ and $50_2$ is stopped, stable supply of the DC voltage supply to the unit side control sections $17_1$ to $17_n$ and the main control section 30 is performed by the other.

In the power supply unit $41_1$, a rush current prevention circuit $42_1$ is an element provided in the downstream side of the unit side control section $17_1$ and preventing a rush current from flowing in the unit side control section $17_1$ when the power supply unit $41_1$ is inserted in a slot of an information processor. The DC voltage supply $V_{G1}$ and the DC voltage supply $V_{G2}$ from the external control power supply units $50_1$ and $50_2$ are supplied to the unit side control section $17_1$ via a cable (not shown) and the rush current prevention circuit $42_1$ as a DC voltage supply $V_{B1}$.

In the power supply unit $41_n$, a rush current prevention circuit $42_n$ is an element provided in the downstream side of the unit side control section $17_n$ and preventing a rush current from flowing in the unit side control section $17_n$ when the power supply unit $41_n$ is inserted in a slot of the information processor. The DC voltage supply $V_{G1}$ and the DC voltage supply $V_{G2}$ from the external control power supplies $50_1$ and $50_2$ are supplied to the unit side control section $17_n$ via a cable (not shown) and the rush current prevention circuit $42_n$ as a DC voltage supply $V_{Bn}$. The DC voltage supply $V_{G1}$ and the DC voltage supply $V_{G2}$ from the external control power supplies $50_1$ and $50_2$ are supplied to the DC/DC converting section 31 of the main control section 30 via a cable (not shown) as a DC voltage supply $V_C$.

In the structure described above, the AC voltage source $V_{AC}$ supplied to the feeder terminal $TA_1$ is converted into a DC voltage supply $V_{A1}$ by a control power supply unit $15_1$. This DC voltage supply $V_{A1}$ is supplied to the main power supply control section $13_1$. With this, the main power supply control section $13_1$ becomes in the operable state. At this time, it is supposed that the AC/DC converting function of the main power supply unit $12_1$ is in an OFF state, and the DC voltage supply $V_{DC1}$ is not outputted from the main power supply unit $12_1$.

Similar operations to that of the power supply units $41_1$ are performed in the power supply units $41_2$ (now shown) to $41_n$, at the same time as the operation described above. That is, the AC voltage source $V_{AC}$ supplied to the feeder terminal $TA_n$ is converted into a DC voltage supply $V_{An}$ by the control power supply unit $15_n$. This DC voltage supply $V_{An}$ is supplied to the main power supply control section $13_n$. With this, the main power supply control section $13_n$ becomes in the operable state. At this time, it is supposed that the AC/DC converting function of the main power supply unit $12_n$ is in an OFF state, and the DC voltage supply $V_{DCn}$ is not outputted from the main power supply unit $12_n$.

The AC voltage source $V_{AC}$ supplied to the feeder terminal $TB_1$ is converted into the DC voltage supply $V_{G1}$ by the AC/DC converting section $51_1$ of the external control power supply unit $50_1$, at the same time as the operations of the control power supplies $15_1$ to $15_n$ described above. Similarly, the AC voltage source $V_{AC}$ supplied to the feeder terminal $TB_2$ is converted into the DC voltage supply $V_{G2}$ by the AC/DC converting section $51_2$ of the external control power supply unit $50_2$.

The DC voltage supplies $V_{G1}$ and $V_{G2}$ are supplied to the DC/DC converting section 31 of the main control section 30 via the diodes $52_1$ and $52_2$ and the cables (not shown) as the DC voltage supply $V_C$. With this, the main control section 30 becomes in the operable state. Further, the DC voltage supplies $V_{G1}$ and $V_{G2}$ are supplied to the unit side control sections $17_1$ to $17_n$ via the diodes $52_1$ and $52_2$, the cables (not shown), and the rush current prevention circuits $42_1$ to $42_n$ as the DC voltage supplies $V_{B1}$ to $V_{Bn}$. With this, the unit side control sections $17_1$ to $17_n$ become in the operable state.

When a start switch (not shown) of the main control section 30 is pressed down, an ON signal is transmitted from the main control section 30 to the respective unit side control sections $17_1$ to $17_n$ via the interfaces $18_1$ to $18_n$ in accordance with a predetermined sequence. With this, through the operations described above, the DC voltage supplies $V_{DC1}$ to $V_{DCn}$ are outputted from the main power supplies $12_1$ to $12_n$. These DC voltage supplies $V_{DC1}$ to $V_{DCn}$ are supplied to the load 20 as the DC voltage supply $V_{DC}$.

Here, when abnormality occurs in the control power supply unit $15_1$, the unit side control section $17_1$ becomes in the communication abnormality state in which communication is impossible with the main power supply control section $13_1$. At this time since being supplied the DC voltage supplies $V_{G1}$ and $V_{G2}$ from the external control power supplies $50_1$ and $50_2$, the unit side control section $17_1$ is in an operable state regardless of abnormality of the control power supply unit $15_1$. When detecting the communication abnormality, the unit side control section $17_1$ transmits an abnormality detection signal showing that abnormality has occurred inside the power supply units $41_1$ to the main control section 30 via the interface $18_1$. When receiving this abnormality detection signal, the main control section 30 generates a power supply unit abnormality alarm showing that abnormality has occurred in the power supply units $41_1$.

Since the conventional power supply 10 shown in FIG. 5 is constituted so as to supply the DC voltage supplies to both of the main power supply control section $13_1$ and the unit side control section $17_1$ from one control power supply unit $15_1$ inside the power supply units $11_1$ as described above, for example, when the control power supply unit $15_1$ fails, both functions of the main power supply control section $13_1$ and the unit side control section $17_1$ stop simultaneously.

Accordingly, in this case, since the abnormality detection signal is not outputted from the unit side control section $17_1$ to the main control section 30, an extremely serious problem from a maintenance point of view occurs in which abnormality in the power supply units $11_1$ cannot totally be recognized in the main control section 30.

On the other hand, since the power supply device 40 shown in FIG. 6 is constituted so as to supply the DC voltage supplies individually to the main power supply control section $13_1$ and the unit side control section $17_1$ by the dual circuits power supply including the external control power supplies $50_1$ and $50_2$ and the control power supply unit $15_1$, the problem such as that of the power supply 10 described above does not occur.

However, since the power supply device 40 is constituted in such a manner that the external control power supplies $50_1$ and $50_2$ are separately provided for the power supply units $41_1$ to $41_n$, the number of power supplies increases compared with that of the power supply 10 and extra space and cables are needed, thereby resulting in the problem that the device costs more.

SUMMARY OF THE INVENTION

It is an object of the present invention to provide a power supply device by which the cost can be reduced and the reliability can be enhanced.

In order to attain the above described object, the invention according to first aspect is characterized in a power supply device comprising a plurality of power supply units (corresponding to power supply units $101_1$ to $101_n$ of a first embodiment described later) each comprising a main power supply unit (corresponding to main power supply units $12_1$ to $12_n$ of the first embodiment described later) generating a load voltage to be supplied to a load, a control unit (corresponding to unit side control sections $17_1$ to $17_n$ of the first embodiment described later) informing the outside of the result of abnormality monitoring of each section, and a control power supply unit (corresponding to control power supply units $15_1$ to $15_n$ of the first embodiment described later) generating a controlling voltage to be supplied to the control unit, said power supply units being constituted as a parallel redundancy structure, wherein each said control unit in the plural power supply units is parallel connected to the control power supply units in other power supply units in addition to the control power supply unit in the power supply unit thereof.

According to this invention, the load voltages are supplied from each main power supply unit in the plural power supply units to the load. The controlling voltages are supplied from each control power supply unit in the plural power supply units to the control unit. Paying attention to the control unit in one power supply unit, the control unit not only receives the supply of the controlling voltage from the control power supply unit in the power supply unit thereof but also receives the supplies of the controlling voltages from the control power supplies in other power supply units.

Even when abnormality occurs in the control power supply unit in the power supply unit thereof and the output of the controlling voltage from this control power supply unit stops, the controlling voltages are supplied from the control power supplies in other power supply units to the control unit of the power supply unit thereof. That is, this control unit continues the normal operation thereof regardless of the abnormality of the control power supply unit in the power supply unit thereof. Therefore, this control unit detects the abnormality in the power supply unit thereof and informs the outside of this monitoring result.

As described above, since the invention according to first aspect is constituted in such a manner that the controlling voltages are parallel supplied not only from the control power supply unit in the power supply unit thereof but also from the control power supply units in other power supply units to the control unit in the power supply unit thereof, even when abnormality occurs in the control power supply unit in the power supply unit thereof, the control unit in question can receive the supplies of the controlling voltages from the control power supply units in other power supply units so as to inform the outside of the abnormality in the power supply unit thereof, thereby enabling the enhancement of the reliability.

Further, since the invention according to first aspect is constituted in such a manner that the controlling voltages as a backup is supplied from the control power supply units in other power supply units to the control unit in the power supply unit thereof, the number of power supplies and the number of cables can be reduced compared with the case in which control power supplies are separately provided in the outside as in the prior art, thereby enabling the reduction of the cost.

The invention according to second aspect is characterized in that the power supply of first aspect further comprises converting unit (corresponding to DC/DC converting sections $202_1$ to $202_n$ of a second embodiment described later) being inserted in the upstream side of the control unit, converting the inputted controlling voltage into a constant controlling voltage, and supplying the controlling voltage to the control unit.

According to this invention, the load voltages are supplied from each main power supply unit in the plural power supply units to the load. The controlling voltages are supplied from each control power supply unit in the plural power supply units to the control unit via the converting unit. Paying attention to the control unit in one power supply unit, the control unit not only receives the supply of the controlling voltage from the control power supply unit in the power supply unit thereof but also receives the supplies of the controlling voltages from the control power supply units in other power supply units.

Even when abnormality occurs in the control power supply unit in the power supply unit thereof and the output of the controlling voltage from this control power supply unit stops, the controlling voltages are supplied from the control power supply units in other power supply units to the control unit of the power supply unit thereof via the converting unit. At this time the converting unit converts the inputted controlling voltages into the constant controlling voltage and supplies this to the control unit.

Thus, even when a line drop is generated between the control unit in the power supply unit thereof and the control unit in other power supply units, the constant controlling voltage is always supplied to the control unit in the power supply unit thereof without being influenced by the line drop. That is, this control unit continues its normal operation regardless of the abnormality of the control power supply unit in the power supply unit thereof. Therefore, this control unit detects the abnormality in the power supply unit thereof and informs the outside of this monitoring result.

As described above, since the invention according to second aspect is constituted in such a manner that the converting unit is provided to compensate for the line drop so that the constant controlling voltage is always supplied to the control unit, the reliability can be further enhanced.

The invention according to third aspect is characterized in that the power supply of first or second aspects further comprises rush current prevention unit (corresponding to diodes $14_1$ to $14_n$, diodes $16_1$ to $16_n$, and rush current prevention circuits $102_1$ to $102_n$ of the first and second embodiments described later) being provided in each downstream side of the main power supply unit, the control power supply unit, and the control unit so as to prevent a rush current from flowing in.

Since this invention is constituted in such a manner that the flowing of a rush current into the power supply units is prevented even when the power supply units are hot-line connected by providing the rush current prevention unit, hot-line maintenance can safely be executed.

The invention according to fourth aspect is characterized in a power supply comprising a power supply unit comprising a main power supply unit generating a load voltage to be supplied to a load, a control unit informing the outside of the result of abnormality monitoring of each section, and a control power supply unit generating a controlling voltage to be supplied to the control unit, said power supply unit constituting part of a parallel redundancy structure along with other power supply units, wherein said control unit is parallel connected to the control power supplies in the other power supply units in addition to the control power supply unit of the power supply unit thereof.

Since this invention is constituted in such a manner that the controlling voltages are parallel supplied to the control unit in the power supply unit thereof not only from the control power supply unit in the power supply unit thereof but also from the control power supplies in other power supply units, even when abnormality occurs in the control power supply unit in the power supply unit thereof, this control unit can receive the supplies of the controlling voltages from the control power supplies in other power supply units so as to inform the outside of the abnormality in the power supply unit thereof, thereby enabling the enhancement of the reliability.

Further, since this invention is constituted in such a manner that the controlling voltages as a backup is supplied from the control power supply units in other power supply units to the control unit in the power supply unit thereof, the number of power supplies and the number of cables can be reduced compared with the case in which control power supply units are separately provided in the outside as in the prior art, thereby enabling the reduction of the cost.

The invention according to fifth aspect is characterized in a power supply comprising a power supply unit comprising a control unit informing the outside of the result of abnormality monitoring of each section and a control power supply unit generating a controlling voltage to be supplied to the control unit, said power supply unit constituting part of a parallel redundancy structure along with other power supply units, wherein said control unit is parallel connected to the control power supply units in the other power supply units in addition to the control power supply unit of the power supply unit thereof.

Since this invention is constituted in such a manner that the controlling voltages are parallel supplied to the control unit in the power supply unit thereof not only from the control power supply unit in the power supply unit thereof but also from the control power supplies in other power supply units, even when abnormality occurs in the control power supply unit in the power supply unit thereof, this control unit can receive the supplies of the controlling voltages from the control power supplies in other power supply units so as to inform the outside of the abnormality in the power supply unit thereof, thereby enabling the enhancement of the reliability.

Further, since this invention is constituted in such a manner that the controlling voltages as a backup is supplied from the control power supply units in other power supply units to the control unit in the power supply unit thereof, the number of power supplies and the number of cables can be reduced compared with the case in which control power supply units are separately provided in the outside as in the prior art, thereby enabling the reduction of the cost.

Other objects and features of this invention will become understood from the following description with reference to the accompanying drawings.

DESCRIPTION OF THE PREFERRED EMBODIMENTS

In the below, first embodiment and second embodiment according to the present invention will be explained in detail referring to drawings.

Figure 1:
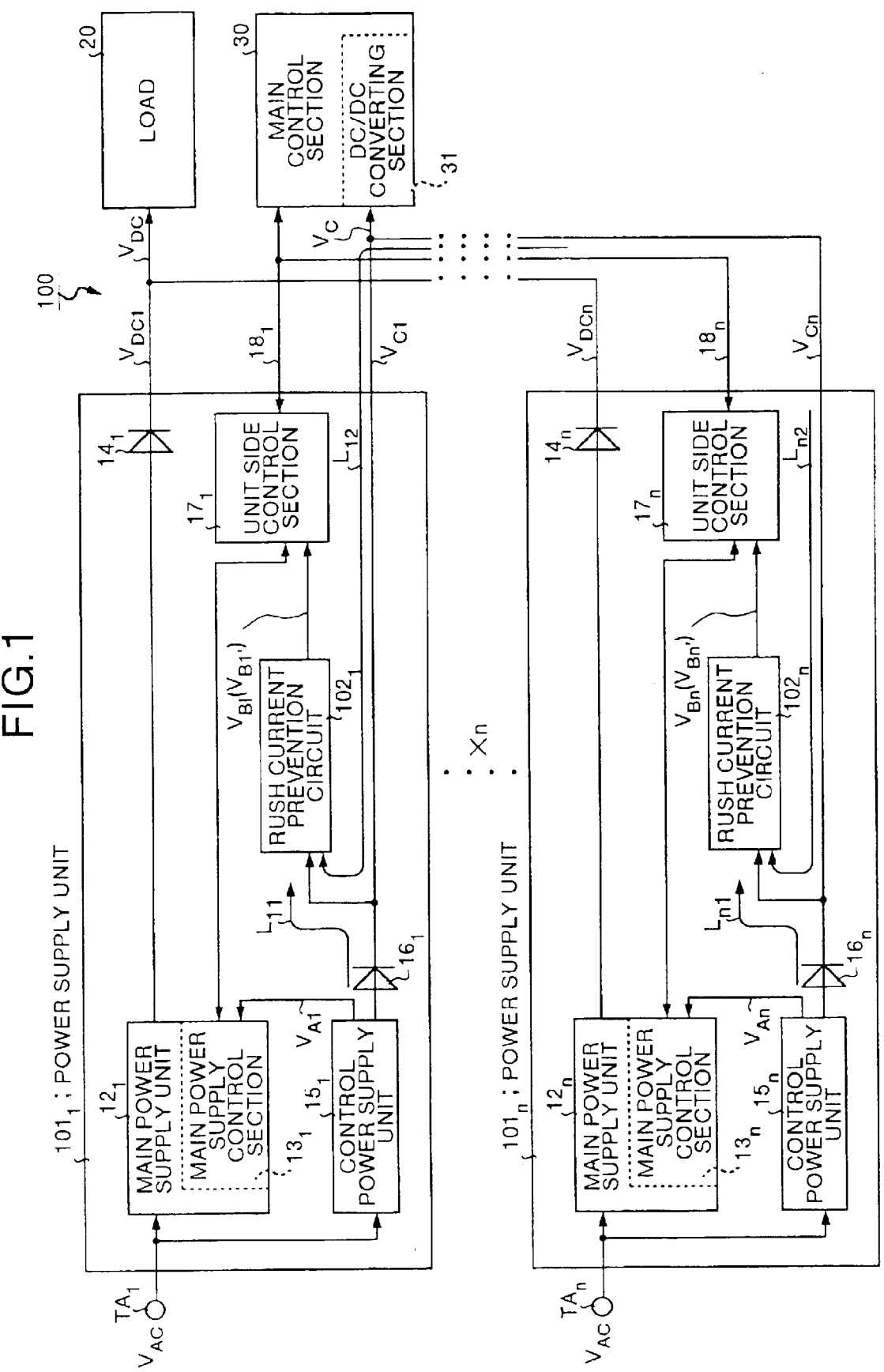
FIG. 1 is a block diagram showing the structure of a first embodiment according to the present invention.
Figure 5:
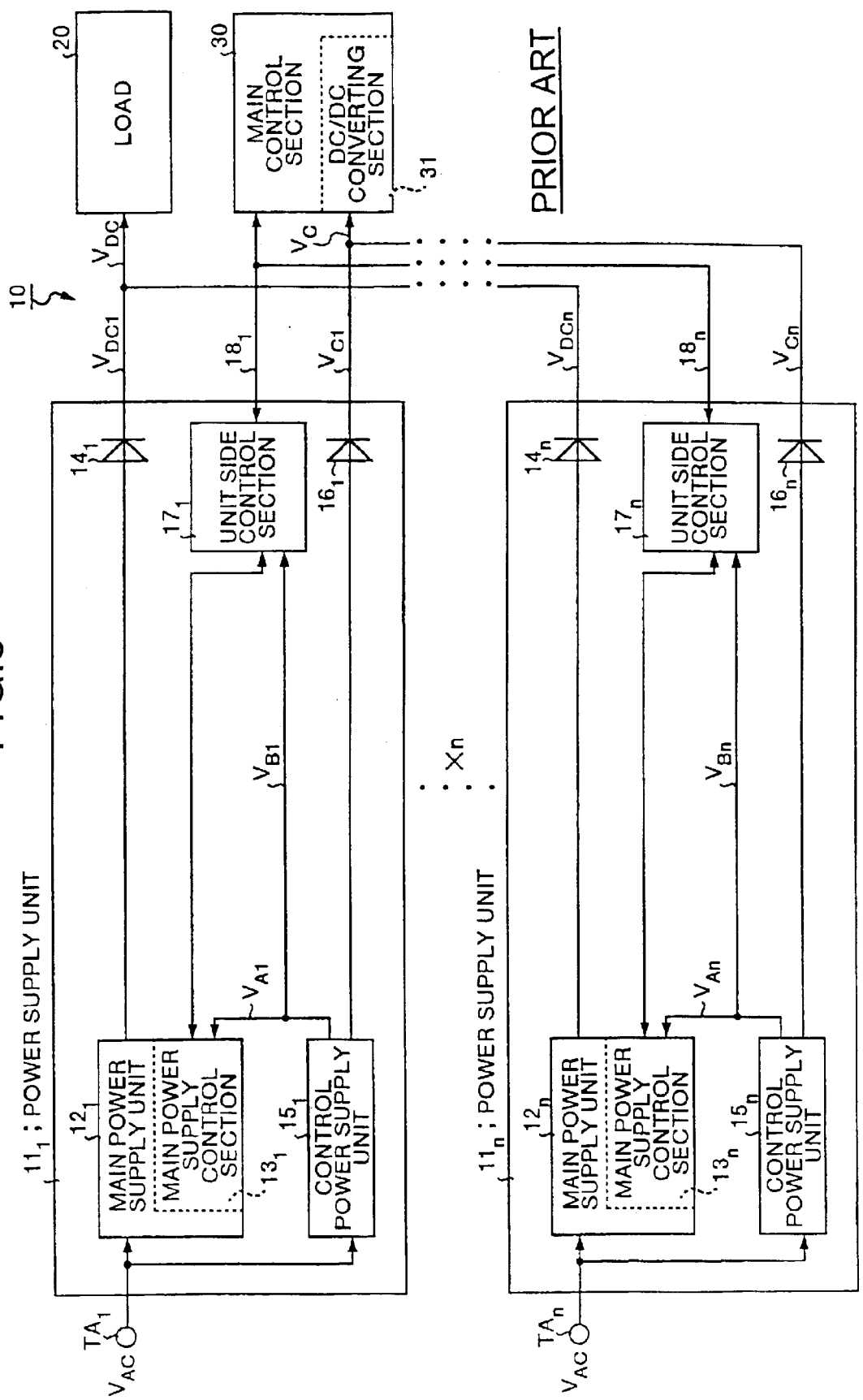
FIG. 5 is a block diagram showing the structure of the conventional power supply 10.

FIG. 1 is a block diagram showing the structure of the first embodiment according to the present invention. In a power supply 100 shown in this drawing, like reference numerals are attached to the sections corresponding to the respective sections of FIG. 5. In FIG. 1, power supply units $101_1$ to $101_n$ are provided as substitutes for the power supply units $11_1$ to $11_n$ shown in FIG. 5, and rush current prevention circuits $102_1$ to $102_n$ are newly provided.

In the power supply unit $101_1$, the rush current prevention circuit $102_1$ is an element inserted between the cathode of a diode $16_1$ and the unit side control section $17_1$ and preventing a rush current from flowing in the unit side control section $17_1$ when the power supply unit $101_1$ is inserted in a slot of an information processor (whose drawing is omitted).

A DC voltage supply is supplied to the unit side control section $17_1$ via dual feeder paths of a feeder path $L_{11}$ and a backup feeder path $L_{12}$. That is, a DC voltage supplies $V_{B1}$ from the control power supply unit $15_1$ is supplied to the unit side control section $17_1$ via the feeder path $L_{11}$ (the diode $16_1$). When the control power supply unit $15_1$ fails and feeding via the feeder path $L_{11}$ stops, a backup DC voltage supply $V_{B1}'$ from a control power supply units $15_2$ (not shown) to $15_n$ is supplied to the unit side control section $17_1$ via the backup feeder path $L_{12}$ instead of the feeder path $L_{11}$.

In the power supply unit $101_n$, the rush current prevention circuit $102_n$ is an element inserted between the cathode of a diode $16_n$ and the unit side control section $17_n$ similarly to the rush current prevention circuit $102_1$ and preventing a rush current from flowing in the unit side control section $17_n$ when the power supply unit $101_n$ is inserted in a slot of the information processor.

A DC voltage supply is supplied to the unit side control section $17_n$ via dual feeder paths of a feeder path $L_{n1}$ and a backup feeder path $L_{n2}$. That is, a DC voltage supplies $V_{Bn}$ from a control power supply unit $15_n$ is supplied to the unit side control section $17_n$ via the feeder path $L_{n1}$ (the diode $16_n$)

When the control power supply unit $15_n$ fails and feeding via the feeder path $L_{n1}$ stops, a backup DC voltage supply $V_{Bn}'$ from the control power supply units $15_1$ to $15_{n\text{-}1}$ (not shown) is supplied to the unit side control section $17_n$ via the backup feeder path $L_{n2}$ instead of the feeder path $L_{n1}$. Each structure of the power supply units $101_2$ to $101_{n\text{-}1}$ (whose drawings are omitted) are the same as the structure of the power supply unit $101_1$ and the power supply unit $101_n$ described above.

In the structure described above, the AC voltage source $V_{AC}$ supplied to the feeder terminal $TA_1$ is converted into a DC voltage supply $V_{A1}$, a DC voltage supply $V_{B1}$, and a DC voltage supply $V_{C1}$ by the control power supply unit $15_1$. These DC voltage supplies $V_{A1}$ and $V_{C1}$ are supplied to the main power supply control section $13_1$ and the DC/DC converting section 31. With this, the main power supply control section $13_1$ and the main control section 30 become in the operable state.

The DC voltage supply $V_{B1}$ from the control power supply unit $15_1$ is supplied to the unit side control section $17_1$ via the rush current prevention circuit $102_1$ through the feeder path $L_{11}$. At this time, it is supposed that an AC/DC converting function of the main power supply unit $12_1$ is in an OFF state, and the DC voltage supply $V_{DC1}$ is not outputted from the main power supply unit $12_1$.

Similar operations to that of the power supply units $101_1$ are also performed in the power supply units $101_2$ (now shown) to $101_n$, at the same time as the operation described above. That is, the AC voltage source $V_{AC}$ supplied to the feeder terminal $TA_n$ is converted into a DC voltage supply $V_{An}$, a DC voltage supply $V_{Bn}$, and a DC voltage supply $V_{Cn}$ by the control power supply unit $15_n$. These DC voltage supplies $V_{An}$ and $V_{Cn}$ are supplied to the main power supply control section $13_n$ and the DC/DC converting section $31$.

With this, the main power supply control section $13_n$ and the main control section $30$ becomes in the operable state. The DC voltage supply $V_{Bn}$ from the control power supply unit $15_n$ is supplied to the unit side control section $17_n$ via the rush current prevention circuit $102_n$ through the feeder path $L_{n1}$. At this time, it is supposed that the AC/DC converting function of the main power supply unit $12_n$ is in an OFF state and the DC voltage supply $V_{DCn}$ is not outputted from the main power supply unit $12_n$.

When a start switch (not shown) of the main control section $30$ is pressed down, an ON signal is transmitted from the main control section $30$ to the respective unit side control sections $17_1$ to $17_n$ via the interfaces $18_1$ to $18_n$ in accordance with a predetermined sequence. When the ON signal is received, the unit side control section $17_1$ transmits the ON signal to the main power supply control section $13_1$. When receiving this ON signal, the main power supply control section $13_1$ turns the AC/DC converting function of the main power supply unit $12_1$ on. With this the main power supply unit $12_1$ converts the AC voltage source $V_{AC}$ supplied to the feeder terminal $TA_1$ into the DC voltage supply $V_{DC1}$ and then supplies this to the load $20$ via the diode $14_1$ and the cable (not shown).

Similar operations to that of the power supply units $101_1$ are also performed in the power supply units $101_2$ (now shown) to $101_n$, at the same time as the operation of the power supply unit $101_1$. That is, when the ON signal from the main control section $30$ is received, the unit side control section $17_n$ transmits the ON signal to the main power supply control section $13_n$. When receiving this ON signal, the main power supply control section $13_n$ turns the AC/DC converting function of the main power supply unit $12_n$ on. With this the main power supply unit $12_n$ converts the AC voltage source $V_{AC}$ supplied to the feeder terminal $TA_n$ into the DC voltage supply $V_{DCn}$ and then supplies this to the load $20$ via the diode $14_n$ and the cable (not shown).

When abnormality occurs in the control power supply unit $15_1$, feeding the DC voltage supply from the control power supply unit $15_1$ to the main power supply control section $13_1$ and the unit side control section $17_1$ stops. At this time the backup DC voltage supply $V_{B1}'$ from the control power supply units $15_2$ (not shown) to $15_n$ is supplied to the unit side control section $17_1$ via the backup feeder path $L_{12}$ instead of the feeder path $L_{11}$. Thus, the unit side control section $17_1$ continues its normal operation regardless of the abnormality of the control power supply unit $15_1$.

The unit side control section $17_1$ may become in a communication abnormality state in which it cannot communicate with the main power supply control section $13_1$. With this the unit side control section $17_1$ transmits an abnormality detection signal showing that abnormality has occurred inside the power supply units $101_1$ to the main control section $30$ via the interface $18_1$. When receiving this abnormality detection signal, the main control section $30$ generates a power supply unit abnormality alarm showing that abnormality has occurred in the power supply units $101_1$.

As explained above, since the first embodiment is constituted in such a manner that the backup DC voltage supply $V_{B1}'$ is parallel supplied to the unit side control section $17_1$ from the control power supply units $15_2$ (not shown) to $15_n$ in other power supply units $101_2$ to $101_n$ in addition to the DC voltage supply $V_{B1}$ from the control power supply unit $15_1$ in the power supply unit thereof (e.g., the power supply unit $101_1$), even when abnormality occurs in the control power supply unit $15_1$, the unit side control section $17_1$ can receive the supply of the backup DC voltage supply $V_{B1}'$ from other control power supply units $15_2$ to $15_n$ so as to inform the outside of abnormality in the power supply unit $101_1$. Thus, the reliability can be enhanced.

Figure 6:
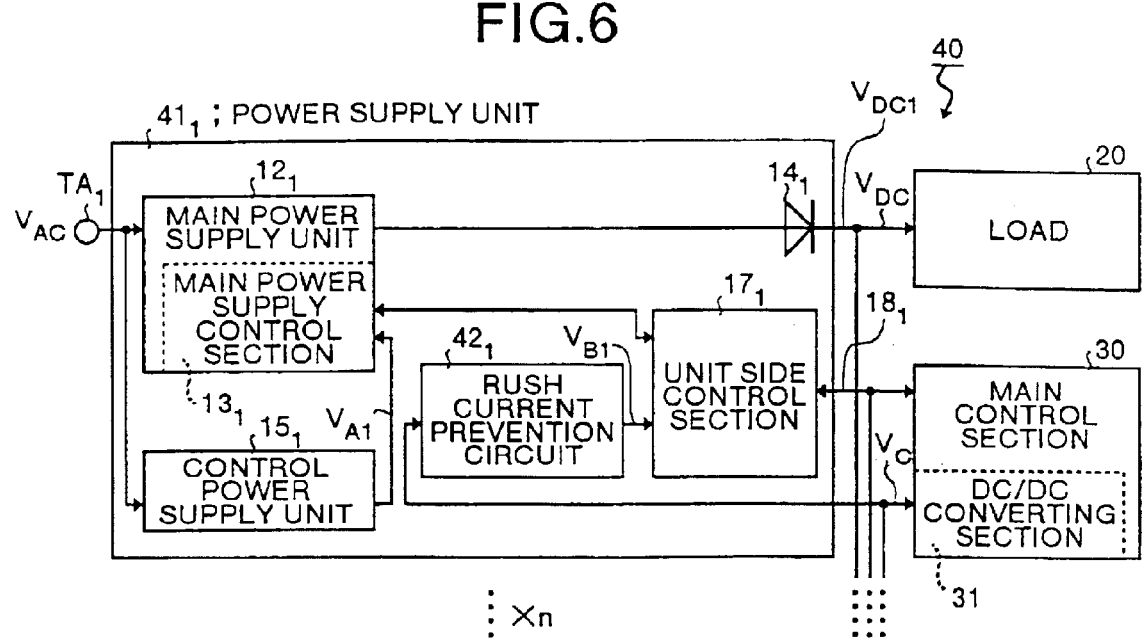
FIG. 6 is a block diagram showing the structure of the conventional power supply device 40.
Figure 6:
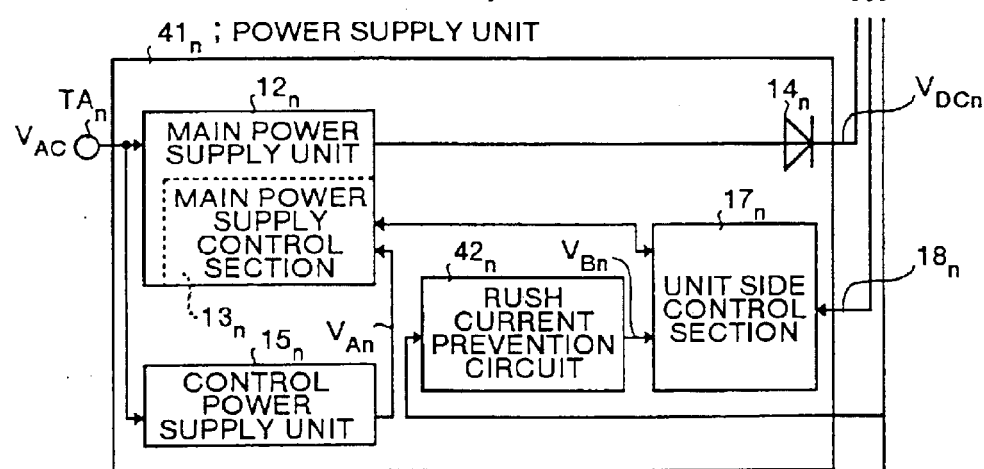
Figure 6:
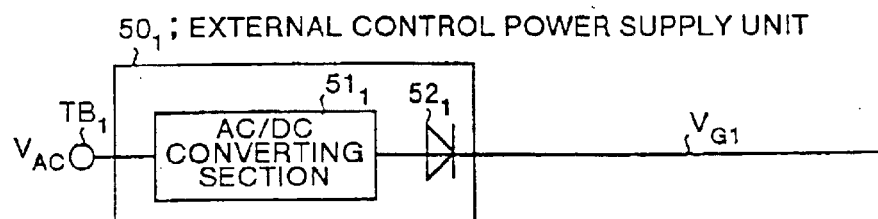
Figure 6:
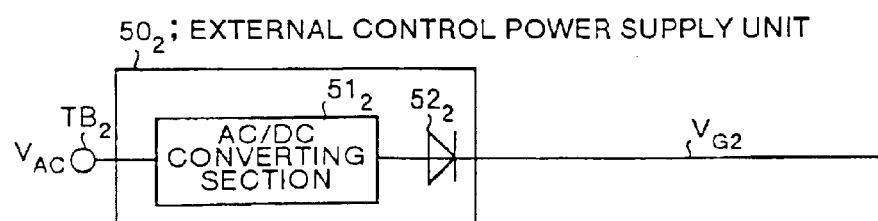

Further, according to the present invention regarding the first embodiment, since the number of power supplies and the number of cables can be reduced compared with the case in which the external control power supply units $50_1$ and $50_2$ are separately provided in the outside as in the conventional power supply $40$ (refer to FIG. 6), the cost can be reduced.

Moreover, since the first embodiment is constituted in such a manner that the flowing of a rush current into the power supply units $101_1$ to $101_n$ is prevented even when the power supply units $101_1$ to $101_n$ are hot-line connected by providing the diodes $14_1$ to $14_n$, the diodes $16_1$ to $16_n$, and the rush current prevention circuits $102_1$ to $102_n$, hot-line maintenance can safely be executed.

Figure 2:
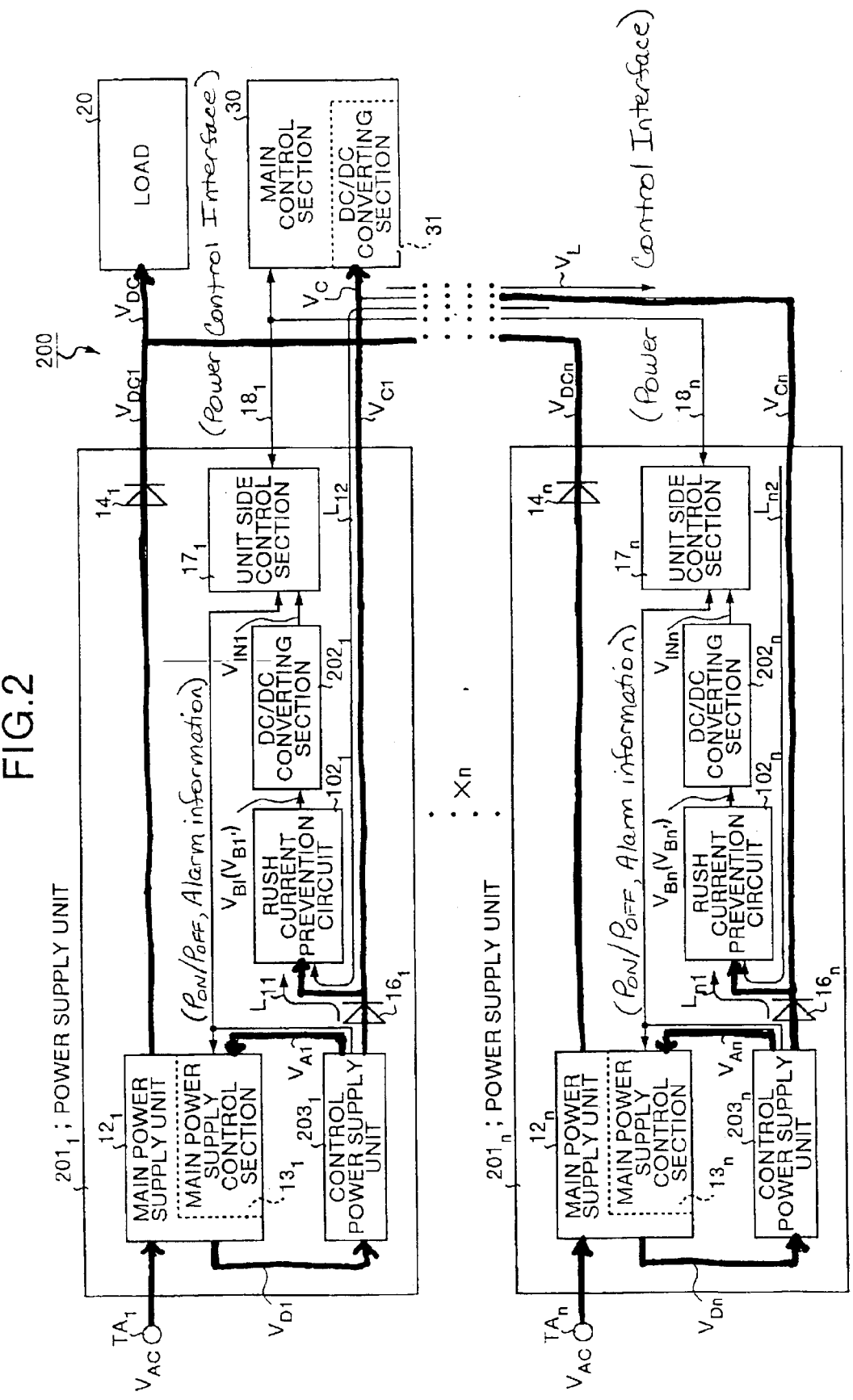
FIG. 2 is a block diagram showing the structure of a second embodiment according to the present invention.
Figure 3:
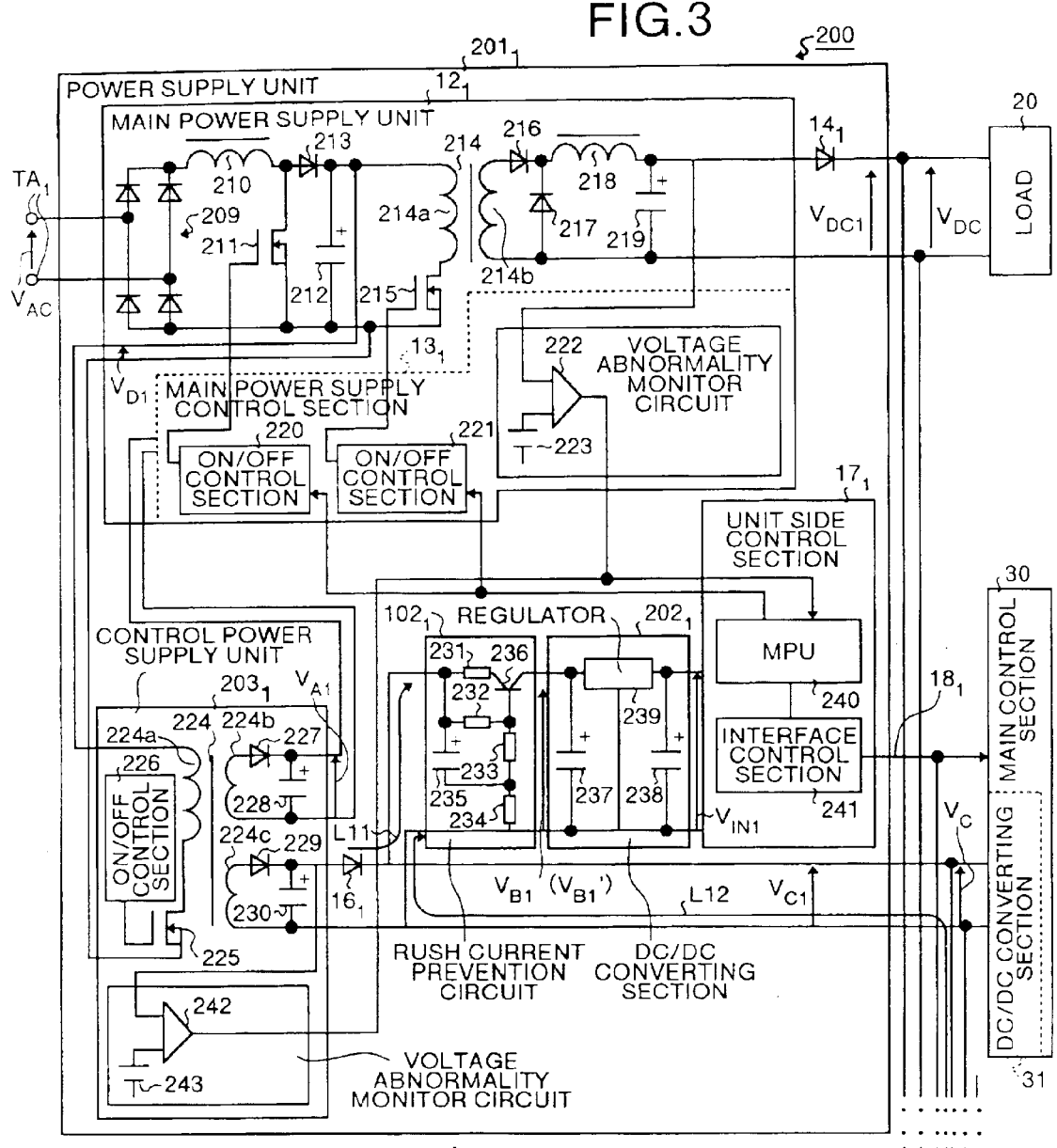
FIG. 3 is a circuit diagram showing a concrete structure of the second embodiment.
Figure 3:
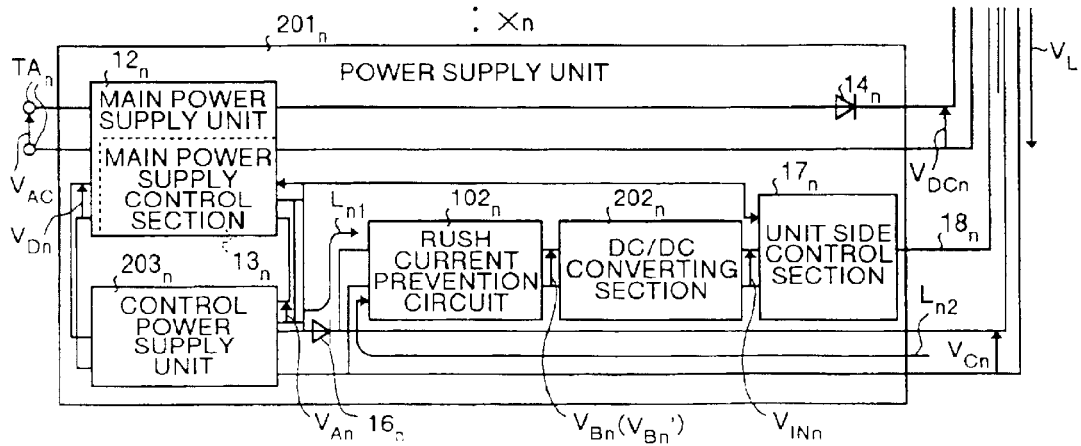

FIG. 2 is a block diagram showing the structure of the second embodiment according to the present invention. FIG. 3 is a circuit diagram showing a concrete structure of the second embodiment. In a power supply device $200$ shown in these drawings, like reference numerals are attached to the sections corresponding to the respective sections of FIG. 1. In FIG. 2, power supply units $201_1$ to $201_n$ and control power supplies $203_1$ to $203_n$ are provided as substitutes for the power supply units $101_1$ to $101_n$ and the control power supplies $15_1$ to $15_n$ shown in FIG. 1, and DC/DC converting sections $202_1$ to $202_n$ are newly provided.

The main power supply unit $12_1$ shown in FIG. 3 comprises a diode bridge circuit $209$ full-wave rectifying the AC voltage source $V_{AC}$, a choking coil $210$, a switching element $211$ switchingly controlled by an ON/OFF control section $220$ described later so as to improve the power factor, a smoothing capacitor $212$, a diode $213$, and a transformer $214$. A switching element $215$ is inserted in a primary side coil $214a$ of the transformer $214$ so as to stabilize the DC voltage supply $V_{DC1}$. A rectifying-smoothing circuit composed of diodes $216$, $217$, a choking coil $218$, and a smoothing capacitor $219$ is connected in a secondary side coil $214b$ of the transformer $214$.

In the main power supply control section $13_1$, the ON/OFF control section $220$, $221$ ON/OFF control the switching element $211$, $215$ based on an ON/OFF control signal from the unit side control section $17_1$ described later. A voltage abnormality monitor circuit $222$ is a circuit for monitoring voltage abnormality, such as an overvoltage and a low voltage, based on the result of a comparison between a reference DC voltage supply of a reference dc power supply $223$ and the DC voltage supply $V_{DC1}$. This voltage abnormality monitor circuit $222$ transmits an abnormality detection signal to an MPU (Micro Processing Unit) $240$ of the unit side control section $17_1$ as the monitor result when detecting voltage abnormality.

A control power supply unit $203_1$ is inserted between the main power supply unit $12_1$ and the DC/DC converting section 31 and has a DC/DC converting function for converting a DC voltage supply $V_{D1}$ into predetermined values of DC voltage supply $V_{A1}$ and DC voltage supply $V_{C1}$, respectively, taking the voltage between terminals of the smoothing capacitor 212 of the main power supply unit $12_1$ (the DC voltage supply $V_{D1}$ may be, for example, 380 volts) as an input. This control power supply unit $203_1$ has a transformer 224 with a primary coil 224a, secondary coils 224b, 224c. In this primary coil 224a, a switching element 225 is inserted for stabilizing the DC voltage supply $V_{A1}$ and the DC voltage supply $V_{C1}$. This switching element 225 is ON/OFF controlled by an ON/OFF control section 226.

A rectifying-smoothing circuit composed of a diode 227 and a smoothing capacitor 228 is connected in the secondary coil 224b. The DC voltage supply $V_{A1}$ from this rectifying-smoothing circuit is supplied to each section of the main power supply control section $13_1$. A rectifying-smoothing circuit composed of a diode 229 and a smoothing capacitor 230 is connected in the secondary coil 224c. The DC voltage supply $V_{C1}$ from this rectifying-smoothing circuit is supplied to the DC/DC converting section 31 (the main control section 30) via the diode $16_1$.

A voltage abnormality monitor circuit 242 is a circuit for monitoring voltage abnormality, such as an overvoltage and a low voltage, based on the result of a comparison between a reference DC voltage supply of a reference dc power supply 243 and the DC voltage supply $V_{C1}$. This voltage abnormality monitor circuit 242 transmits an abnormality detection signal to the MPU 240 of the unit side control section $17_1$ as the monitor result when detecting voltage abnormality.

The rush current prevention circuit $102_1$ is composed of resistances 231 to 234, a capacitor 235, and a switching element 236 and restrains a rush current in such a manner that the switching element 236 is ON/OFF controlled by the time constant of the resistances 231 to 234 and the capacitor 235.

Figure 4:
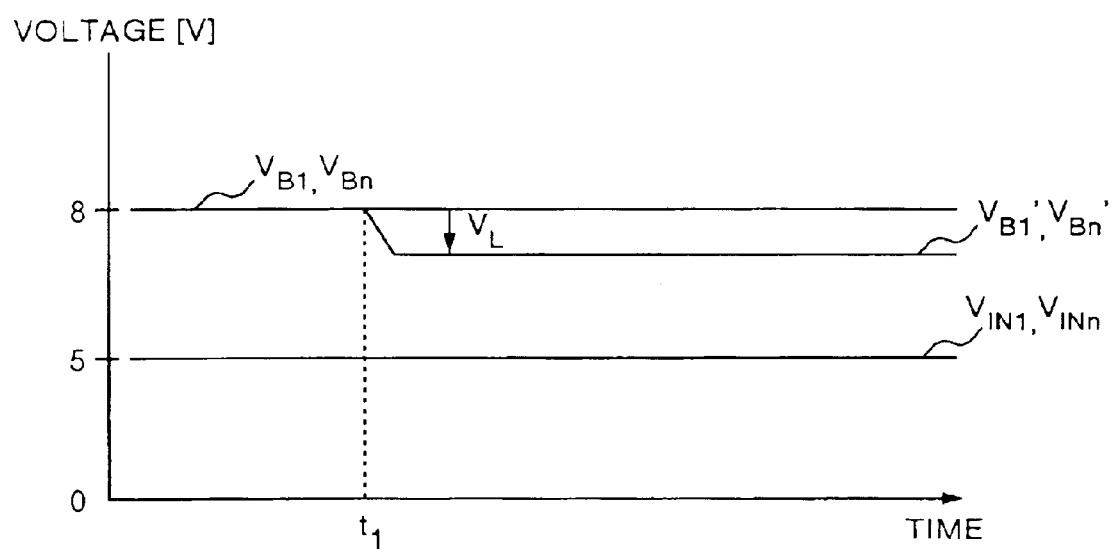
FIG. 4 is a view showing voltage characteristics in the second embodiment.

The DC/DC converting section $202_1$ has a DC/DC converting function in which the DC voltage supply $V_{B1}$ or the backup DC voltage supply $V_{B1}'$ inputted are converted into a constant value of constant DC voltage supply $V_{IN1}$ as shown in FIG. 4. The constant DC voltage supply $V_{IN1}$ is the operation guarantee voltage of the unit side control section $17_1$ and is, for example, 5 volts. The DC/DC converting sections $202_1$ is composed of capacitors 237, 238 and a regulator 239, and this regulator 239 is a power supply element for stabilizing the constant DC voltage supply $V_{IN1}$.

The unit side control section $17_1$ is connected to the main control section 30 via the interface $18_1$ and works as a communication interface between the main power supply control section $13_1$ and the main control section 30. This unit side control section $17_1$ is composed of the MPU 240 and an interface control section 241.

Concretely, the interface control section 241 receives the ON/OFF control signal from the main control section 30 via the interface $18_1$ and sends it to the MPU 240. The MPU 240 transmits the ON/OFF control signal to the ON/OFF control sections 220, 221 of the main power supply control section $13_1$. The MPU 240 receives the abnormality detection signal from the voltage abnormality monitor circuits 222, 242 of the main power supply control section $13_1$ and sends this to the interface control section 241. The interface control section 241 transmits the abnormality detection signal to the main control section 30 via the interface $18_1$.

Similarly, in the power supply unit $201_n$, the DC/DC converting section $202_n$ converts the inputted DC voltage supply $V_{Bn}$ or backup DC voltage supply $V_{Bn}'$ into a constant value of constant DC voltage supply $V_{Inn}$ as shown in FIG. 4. The constant DC voltage supply $V_{Inn}$ is the operation guarantee voltage of the unit side control section $17_n$ and is, for example, 5 volts. The control power supply unit $203_n$ is inserted between the main power supply unit $12_n$ and the DC/DC converting section 31 and has the DC/DC converting function for converting a DC voltage supply $V_{Dn}$ from the main power supply unit $12_n$ (e.g., 380 volts) into predetermined values of DC voltage supply $V_{An}$ and DC voltage supply $V_{Cn}$, respectively, taking the DC voltage supply $V_{Dn}$ as an input. The detailed structures of each section of the power supply unit $201_n$ are the same as the detailed structures of each section of the power supply unit $201_1$ described above.

In the structure described above, the AC voltage source $V_{AC}$ fed to the feeder terminal $TA_1$ shown in FIG. 2 is converted into the DC voltage supply $V_{A1}$, the DC voltage supply $V_{B1}$, and the DC voltage supply $V_{C1}$ by the control power supply unit $203_1$. These the DC voltage supplies $V_{A1}$ and $V_{C1}$ are supplied to the main power supply control section $13_1$ and the DC/DC converting section 31. With this the main power supply control section $13_1$ and the main control section 30 become in the operable state.

The DC voltage supply $V_{B1}$ from the control power supply unit $203_1$ is supplied to the DC/DC converting section $202_1$ via the rush current prevention circuit $102_1$ through the feeder path $L_{11}$. Here, the line drop in the feeder path $L_{11}$ is approximately zero volts since the path length is short. The DC voltage supply $V_{B1}$ is supposed to be 8 volts shown in FIG. 4. The DC voltage supply $V_{B1}$ is converted into 5 volts of constant DC voltage supply $V_{IN1}$ shown in FIG. 4 by means of the DC/DC converting section $202_1$. Since this constant DC voltage supply $V_{In1}$ is supplied to the unit side control section $17_1$, the unit side control section $17_1$ becomes in the operable state. At this time, it is supposed that the AC/DC converting function of the main power supply unit $12_1$ is in the OFF state, and the DC voltage supply $V_{DC1}$ is not outputted from the main power supply unit $12_1$.

Similar operations to that of the power supply units $201_1$ are performed in the power supply units $201_2$ (now shown) to $201_n$, at the same time as the operation described above. The AC voltage source $V_{AC}$ supplied to the feeder terminal $TA_n$ is converted into the DC voltage supply $V_{An}$, the DC voltage supply $V_{Bn}$, and the DC voltage supply $V_{Cn}$ by the control power supply unit $203_n$. These DC voltage supplies $V_{An}$, and $V_{Cn}$ are supplied to the main power supply control section $13_n$ and the DC/DC converting section 31. With this, the main power supply control section $13_n$ and the main control section 30 become in the operable state.

The DC voltage supply $V_{Bn}$ from the control power supply unit $203_n$ is supplied to the DC/DC converting section $202_n$ via the rush current prevention circuit $102_n$ through the feeder path $L_{n1}$. Here, the line drop in the feeder path $L_{n1}$ is approximately zero volts since the path length is short. The DC voltage supply $V_{Bn}$ is supposed to be 8 volts shown in FIG. 4. The DC voltage supply $V_{Bn}$ is converted into 5 volts of constant DC voltage supply $V_{INn}$ shown in FIG. 4 by means of the DC/DC converting section $202_n$. Since this constant DC voltage supply $V_{Inn}$ is supplied to the unit side control section $17_n$, the unit side control section $17_n$ becomes in the operable state. At this time, it is supposed that the AC/DC converting function of the main power supply unit $12_n$ is in the OFF state and the DC voltage supply $V_{DCn}$ is not outputted from the main power supply unit $12_n$.

When a start switch (not shown) of the main control section 30 is pressed down, an ON signal is transmitted from the main control section 30 to the respective unit side control sections $17_1$ to $17_n$ via the interfaces $18_1$ to $18_n$ in accordance with a predetermined sequence. With this, through the operations described above, the DC voltage supplies $V_{DC1}$ to $V_{DCn}$ are outputted from the main power supply units $12_1$ to $12_n$. These DC voltage supplies $V_{DC1}$ to $V_{DCn}$ are supplied to the load 20 as the DC voltage supplies $V_{DC}$.

Here, when abnormality occurs in the control power supply unit $203_1$ at the time $t_1$ shown in FIG. 4, feeding the DC voltage supply from the control power supply unit $203_1$ to the main power supply control section $13_1$ and the unit side control section $17_1$ stops. At this time the backup DC voltage supply $V_{B1}'$ from a control power supply units $203_2$ (not shown) to $203_n$ is supplied to the DC/DC converting section $202_1$ via the backup feeder path $L_{12}$ instead of the feeder path $L_{11}$. When the backup feeder path $L_{12}$ (cable length) is long, a line drop $V_L$ is generated in this backup feeder path $L_{12}$. Therefore, the backup DC voltage supply $V_{B1}'$ decreases by the line drop $V_L$ than the DC voltage supply $V_{Bn}$ (the DC voltage supply $V_{B1}$) as shown in FIG. 4.

However, the backup DC voltage supply $V_{B1}'$ is converted into 5 volts of constant DC voltage supply $V_{IN1}$ shown in FIG. 4 by means of the DC/DC converting section $202_1$ regardless of the line drop $V_L$. That is, the DC/DC converting section $202_1$ performs a voltage compensation for the line drop $V_L$. Thus, a constant (5 volts) DC voltage supply $V_{IN1}$ shown in FIG. 4 is constantly supplied to the unit side control section $17_1$ regardless of abnormality of the control power supply unit $203_1$.

The unit side control section $17_1$ may become in the communication abnormality state in which communication is impossible with the main power supply control section $13_1$. With this the unit side control section $17_1$ transmits an abnormality detection signal showing that abnormality has occurred inside the power supply unit $201_1$ to the main control section 30 via the interface $18_1$. When receiving this abnormality detection signal, the main control section 30 generates a power supply unit abnormality alarm showing that abnormality has occurred in the power supply units $201_1$.

As explained above, since the second embodiment is constituted in such a manner that the DC/DC converting sections $202_1$ to $202_n$ are provided to compensate for line drops so that the constant DC voltage supplies $V_{IN1}$ to $V_{Inn}$ are always supplied to the unit side control sections $17_1$ to $17_n$ the reliability can be further enhanced.

In the above, although the first and second embodiments according to the present invention are explained in detail referring to drawings, concrete structural examples are not limited to these first and second embodiments, and design alteration or the like without departing from the gist of the present invention will be included in the present invention. For example, although the power supplies having the AC/DC converting function are explained in the first and second embodiments, the power supplies may have an AC-AC converting function, a DC-AC converting function, or a DC/DC converting function.

As explained above, since a power supply device according to the present invention is constituted in such a manner that the controlling voltages are parallel supplied not only from the control power supply unit in the power supply unit thereof but also from the control power supply units in other power supply units to the control means in the power supply unit thereof, even when abnormality occurs in the control power supply unit in the power supply unit thereof, the control means can receive the supplies of the controlling voltages from the control power supply units in the other power supply units so as to inform the outside of the abnormality in the power supply unit thereof, thereby producing the effect that the reliability can be enhanced.

Since a power supply device according to the present invention is constituted in such a manner that the controlling voltages as a backup are supplied from the control power supply units in other power supply units to the control means in the power supply unit thereof, the number of power supplies and the number of cables can be reduced compared with the case in which control power supplies are separately provided in the outside as in the prior art, thereby producing the effect that the cost can be reduced.

A power supply according to the present invention is constituted in such a manner that the converting means is provided to compensate for a line drop so that a constant controlling voltage is always supplied to the control means, thereby producing the effect that the reliability can be further enhanced.

A power supply according to the present invention is constituted in such a manner that a rush current prevention means is provided so as to prevent a rush current from flowing in the power supply unit even when the power supply unit is hot-line connected, thereby producing the effect that hot-line maintenance can safely be executed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A power supply device comprising a plurality of power supply units and a main control unit, each of said power supply units comprising:
   a main power supply unit generating a load voltage supply to be supplied to a load;
   a main power supply control unit to activate/inactivate generation of a load voltage supply by the main power supply unit and to monitor output of the main power supply unit;
   a unit side control section unit monitoring the main power supply control unit and sending operational signals to the main power supply control unit;
   a control power supply unit generating a first controlling voltage to the main power supply unit, a second controlling voltage to control the unit side control section unit, and a third controlling voltage to the main control unit; and
   a converting unit being inserted in an upstream side of the unit side control section unit, converting the second controlling voltage into a constant controlling voltage, and supplying the constant controlling voltage to the unit side control section unit,
   wherein the control power supply units included in the plurality of power supply units constitute a parallel redundancy structure providing power to each unit side control section unit of the plurality of power supply units through the converting unit, and the converting unit also converts the second voltage supplied from another control power supply unit in the plurality of power supply units.

2. The power supply device according to claim 1 further comprising a rush current prevention unit being provided in a downstream side of the main power supply unit, the control power supply unit, and an upstream side of the unit side control section unit to prevent a rush current from flowing in.

3. A power supply device comprising:

a main control unit; and a plurality of power supply units, each of said power supply units comprising:

a main power supply unit to generate a load voltage supply to be supplied to a load;

a unit side control unit, to communicate an operation status of the main power supply unit to the main control unit; and a control power supply unit, to supply control voltages to the main power supply unit, the main control unit, and the unit side control unit, wherein the control power supply units included in the plurality of power supply units are provided in parallel to the unit side control units of each of the plurality of the power supply units so as to constitute a parallel redundancy structure for providing power to any of the unit side control units in an event of failure.

4. A power supply device, comprising:

a main control unit that includes a main control section and a converting section;

a plurality of power supply units connected to the main control unit in parallel, each of the power supply units including:

a main power supply unit that generates a load voltage to be supplied to a load external to the power supply unit;

a main power supply control unit that controls generation of the load voltage at the main power supply unit and monitors output of the main power supply unit;

a unit side control section unit that monitors the main power supply control unit and sends operational signals to the main power supply control unit;

a control power supply unit that generates a first controlling voltage to the main power supply unit, a second controlling voltage to control the unit side control section unit, and a third controlling voltage to the main control unit; and wherein the control power supply unit comprises a parallel redundancy structure that provides power to each unit side control section unit of the plurality of power supply units connected in parallel, the converting unit also converts the second controlling voltage from another control power supply unit in the plurality of power supply units into a constant controlling voltage and supplies the constant controlling voltage supply to the unit side control section unit, and the main control section provides an ON/OFF control signal to each of the unit side control section units to perform ON/OFF control of the load voltage supply to the load.

* * * * *